United States Patent [19]

Gluyas et al.

[11] Patent Number: 5,671,445
[45] Date of Patent: Sep. 23, 1997

[54] INTERFACE FOR TRANSMITTING GRAPHICS DATA TO A PRINTER FROM A HOST COMPUTER SYSTEM IN RASTERIZED FORM

[75] Inventors: Stephen David Gluyas, Berlin, N.J.; Joseph A. Horanzy, Philadelphia, Pa.; John L. Scarrow, Redmond, Wash.

[73] Assignee: OKI America, Inc., Hackensack, N.J.

[21] Appl. No.: 510,437

[22] Filed: Aug. 2, 1995

Related U.S. Application Data

[63] Continuation of Ser. No. 94,667, Jul. 19, 1993, abandoned.

[51] Int. Cl.$^6$ .................................................. G06F 13/00
[52] U.S. Cl. ............................................ 395/873; 395/280
[58] Field of Search ...................................... 395/873

[56] References Cited

U.S. PATENT DOCUMENTS

| | | | |
|---|---|---|---|
| 4,897,855 | 1/1990 | Acompora | 375/27 |
| 4,899,337 | 2/1990 | Hirai | 370/80 |
| 4,939,724 | 7/1990 | Ebersale | 370/85.15 |
| 4,956,808 | 9/1990 | Aakre et al. | 395/250 |
| 5,041,918 | 8/1991 | Ishida et al. | 358/442 |
| 5,121,480 | 6/1992 | Bouke et al. | 395/250 |
| 5,150,456 | 9/1992 | Wu et al. | 395/114 |
| 5,163,132 | 11/1992 | DuLac et al. | 395/873 |
| 5,224,213 | 6/1993 | Dieffenderfer et al. | 395/250 |
| 5,396,597 | 3/1995 | Bodin et al. | 395/873 |
| 5,502,822 | 3/1996 | Takebe | 395/873 |
| 5,506,609 | 4/1996 | Claassen et al. | 347/41 |

Primary Examiner—Jack B. Harvey
Assistant Examiner—David A. Wiley
Attorney, Agent, or Firm—Panitch Schwarze Jacobs & Nadel, P.C.

[57] ABSTRACT

A data transmission system transmits data from a first device to an interface device at a continuous rate and includes a first device for storing data and for transmitting data at a first data output rate. An interface device outputs data at a second data output rate different from the first data output rate. A preload buffer initially receives a predetermined amount of data from the first device and stores the initially received data. The preload buffer also transmits at least a portion of the initially received data at a third data output rate. The preload buffer receives additional data from the first device as the initially received data is transmitted from the preload buffer. A first buffer and a second buffer of generally equal size are sized to receive a single block of data from the preload buffer. The size of the single block of data is less than the predetermined amount of output data initially received and stored in the preload buffer. The first buffer first receives a block of data from the preload buffer and then transmits the block of data to the interface device. The second buffer first receives a block of data from the preload buffer and then transmits the block of data to the interface device. The first and second buffers are arranged so that when one of the buffers is receiving data from the preload buffer, the other buffer is transmitting data to the interface device. The interface device receives data from the first and second buffers at a rate sufficient for the interface device to continuously maintain the second data output rate.

20 Claims, 8 Drawing Sheets

INTERFACE FOR TRANSMITTING GRAPHICS DATA TO A PRINTER FROM A HOST COMPUTER SYSTEM IN RASTERIZED FORM

This application is continuation of U.S. application Ser. No. 08/094,667, filed Jul. 19, 1993, now abandoned.

BACKGROUND OF THE INVENTION

The present invention is directed to a data transmission system and, more particularly, a data transmission system for transmitting data from a first device to a second device at a generally continuous rate.

Many host computer systems, such as personal computers are connected to a printer for producing a printed document depicting data which is stored in the host computer's memory or displayed on a CRT associated with the host computer. Typically, the computer data is stored in the memory in ASCII code which is a machine language understood by the host computer. The data is transmitted by an interface to the printer. The printer rasterizes the received ASCII data and converts the data to bit mapped form by hardware located within the printer. The bit mapped data is then reconstructed to form the printed document.

A problem with this type of arrangement is that many times the format of the data is perceivably altered when the ASCII-coded data is rasterized and reconstructed, resulting in an undesirable print output. The alteration of the printed format can destroy the desired look of the printed document by causing part of the data to be deleted from the printed document or by improper formatting of certain characters. As such, there is a need for altering the format of the ASCII code within the host computer system in order to achieve the desired printed output.

Many prior art printers perform all of the rasterization processes required to place the data into a suitable form for printing. By placing the hardware and software necessary for rasterizing the data in the printer, the size and complexity of the printer is necessarily increased as well as the cost of the printer. The additional hardware within the printer may limit the number, size and types of fonts which can be used to produce the printed document. Another disadvantage to placing the hardware and software in the printer is the reduction in performance speed due to the time necessary for converting the ASCII data to a suitable bit mapped form.

There is a need for an interface which is capable of transmitting rasterized data from a host computer system to a printer in bit mapped form to increase the efficiency of the printing process. There is also a need for an interface which is capable of transmitting rasterized data to a printer such that the printed document is constructed in the same format, size and font style as that displayed by the host computer system. It is also desirable to have software contained within the host computer system for producing rasterized data which is transferred to the printer in a continuous stream and at a controlled rate which is compatible with the speed of the printer to prevent overrun or underrun conditions.

SUMMARY OF THE INVENTION

Briefly stated, the present invention comprises a data transmission system for transmitting data from a first device to a second device at a generally continuous rate. The system comprises a first device for storing data and for transmitting data at a first data output rate. A second device outputs data at a second data output rate different from the first data output rate. A preloading means initially receives a predetermined amount of output data from the first device and stores the initially received data. The preloading means also transmits at least a portion of the initially received data at a third output rate. The preloading means receives additional output data from the first device as the initially received data is transmitted from the preloading means. A first buffer and a second buffer of generally equal size are sized to receive a single block of data from the preloading means. The size of the single block of data is less than the predetermined amount of output data initially received and stored in the preloading means. The first buffer receives a block of data from the preloading means and then transmits the block of data to the second device. The second buffer receives a block of data from the preloading means and then transits the block of data to the second device. The first and second buffers are arranged so that when one of the buffers is receiving data from the preloading means, the other buffer is transmitting data to the second device. The second device receives data from the first and second buffers at a rate sufficient for the second device to continuously maintain the second data output rate.

A second embodiment of the present invention comprises an interface for transmitting bit mapped data from a data storage device having a first data output rate to an input/output device having a second data output rate which must be continuously maintained. The second data output rate is different from the first data output rate. The interface comprises a bus for receiving the bit mapped data from the data storage device at the first data output rate. A memory communicates with the bus for initially receiving and storing a predetermined amount of the bit mapped data. Write means communicates with the memory for writing the bit mapped data from the bus into the memory after the memory has received the predetermined amount of data from the first device. The write means transmits the bit mapped data at a first predetermined rate. Read means communicates with the memory for reading the bit mapped data from the memory at a second predetermined rate different from the first predetermined rate. Transport means transports the read data from the memory means into a continuous data stream such that a series of spaced bits is formed. Output means continuously outputs the data to the input/output device at a rate of speed such that the input/output device substantially maintains the second data output rate. dr

BRIEF DESCRIPTION OF THE DRAWINGS

The foregoing summary, as well as the following detailed description, will be better understood when read in conjunction with the appended drawings. For the purpose of illustrating the invention, embodiments which are presently preferred are shown in the drawings. It is understood, however, that this invention is not limited to the precise arrangements and instrumentalities shown.

In the drawings.

DESCRIPTION OF PREFERRED EMBODIMENT

Figure 1:
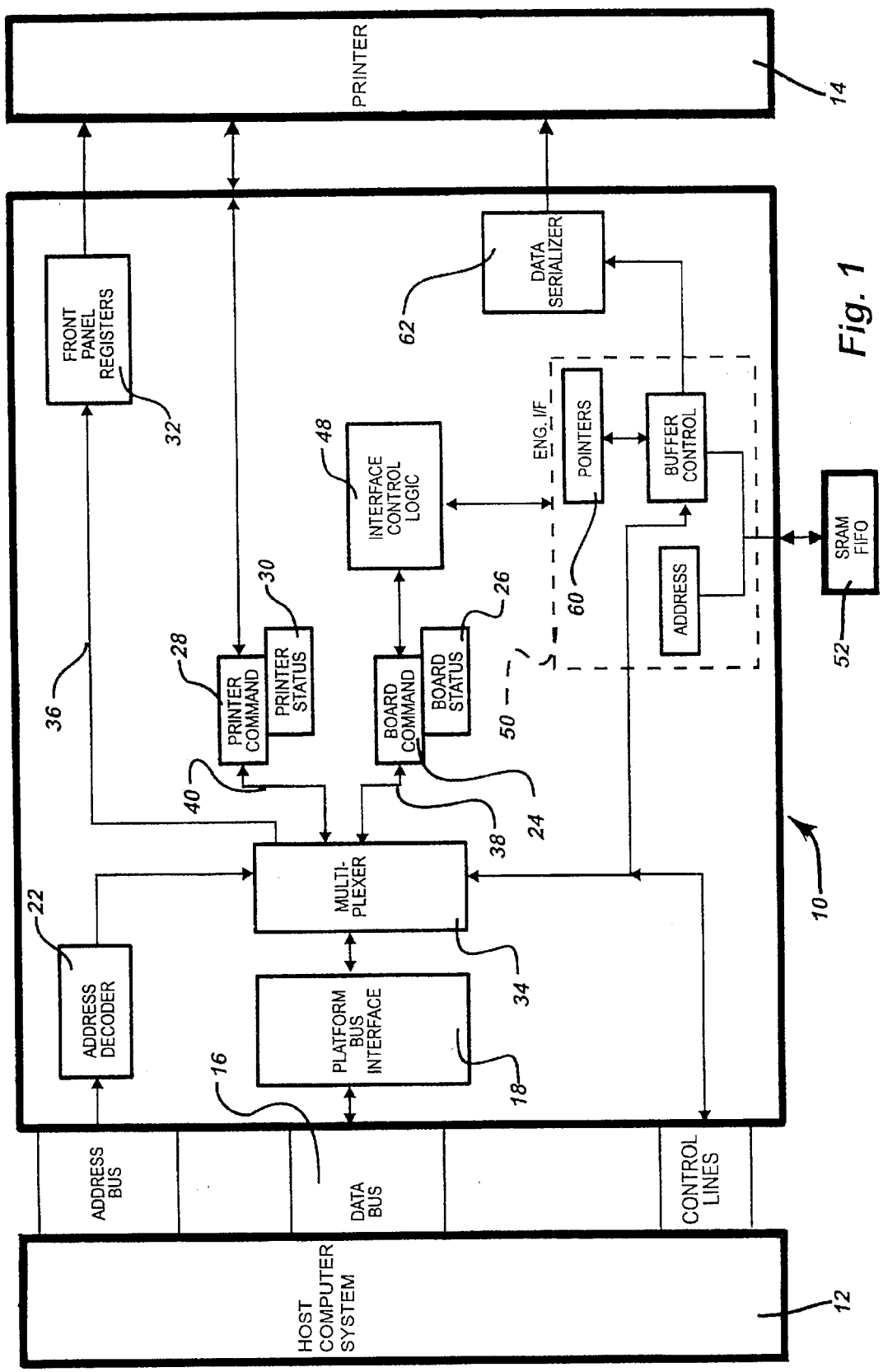
FIG. 1 is a schematic block diagram of an interface for transmitting graphics data from a host computer system to a printer in accordance with the present invention.

Referring to the drawings in detail, wherein like numerals indicate like elements throughout, there is shown in FIG. 1 a preferred embodiment of an interface 10 for transmitting graphics data from a first data storage device to a second device in accordance with the present invention. In the preferred embodiment, the first device is a host computer system 12. The host computer system 12 is preferably a personal computer such as, but not limited to, an IBM or an IBM compatible personal computer. It is to be understood by those skilled in the art that any type of host computer system 12 may be used, such as a mainframe or computer network without departing from the scope and spirit of the present invention. The host computer system 12 stores data to be used by the second device. In the present embodiment the second device is a printer 14 which prints the data received from the host computer 12 in a manner well known in the art. Once the data is ready to be printed, the data is transmitted from the host computer 12 to the interface 10 at a first data output rate. In the preferred embodiment, the first data output rate may range from 50 Kbytes/sec to 16 MBytes/sec depending upon the host computer 12 and is generally characterized by bursts of data separated by pauses due to the manner in which the host computer operates.

In the preferred embodiment, the second device is an input/output device such as, but not limited to, a printer, facsimile machine or scanner. The input/output device is preferably a 4 page per minute or an 8 page per minute LED printer 14, such as the OL800 which is manufactured by Okidata Corporation. However, it is to be understood by those skilled in the art that any type of printer such as, but not limited to, a laser printer, electrophotographic printer or an ink jet printer or any other type of input/output device may be used without departing from the scope and spirit of the present invention. The printer 14 receives the data to be printed from the interface 10 and outputs the printed data at a second data output rate which is different from the first data output rate. Typically, the second device or printer 14 requires data at a constant speed which is significantly faster than the lowest output rate of the first device or host computer 12. In the preferred embodiment, the second data output rate (printer)is 200 Kbyte/sec. Thus, the interface 10 is needed in order to compensate for the differences in data flow rates between the host computer 12 and the printer 14 to provide efficient printing of the received data.

The interface 10 connects the host computer system 12 (via a host computer bus which is contained within the host computer 12) to the printer 14 by way of a printer interface which is contained within the printer 14. The interface 10 is preferably a direct memory access (DMA) video interface which is capable of bidirectional communication and data transfer between the host computer system 12 and the printer 14 at high speeds. Blocks of graphics data are received by the interface 10 from a DMA controller (not shown) located within the host computer system 12 via the host computer interface. In the preferred embodiment, the host computer interface is an ISA (industry standard) bus interface but could be some other type known to those skilled in the art.

In the preferred embodiment, the interface 10 is capable of receiving 16 bits of data at one time. However, it is to be understood by those skilled in the art that any amount of data may be transmitted to the interface 10 at one time without departing from the scope and spirit of the present invention. The data may be graphics or bit mapped data, command data or status data. In the preferred embodiment, 16 bits of bit-mapped, graphics data are transmitted at one time from the host computer system 12 to the interface 10 via a data bus 16. The data bus 16 receives the bit mapped data from the host computer interface at the first data output rate. The command data and the status data are each transmitted in blocks of up to 8 bits. Since the data bus 16 is capable of receiving up to 16 bits of data, typically a pair of command data words and status data words are transmitted over the data bus at one time.

The host computer 12 provides address bits, corresponding to the desired register location in the interface 10, via the address bits presented on the host computer bus. The address bits are received by an address decoder 22 which decodes the bits to determine the destination of the data, and transmits a signal which identifies the data as command data, status data, image information, etc.

Address bits received and decoded by the address decoder 22, in conjunction with other control signals received via the host computer bus, determine register selection. The registers include, but are not limited to, a board command register 24, a board status register 26, an engine or printer command register 28, an engine or printer status register 30 and front panel registers 32 which will be described in detail hereinafter.

The front panel registers 32 are bit registers used to communicate to a user an error within the printer 14 by activating at least one LED (not shown), or other enunciator device located on the operating panel of the printer 14. It is to be understood by those skilled in the art that any number of LEDs or other such devices can be used to indicate error status without departing from the scope and spirit of the present invention.

The board command register 24 provides commands to the interface 10 from the host computer system 12 to control the operation of the interface 10. The commands which can be transmitted to the interface 10 include, but are not limited to, an end of page command, a board reset command, a printer start command and a DMA ready to send command. The end of page command notifies the interface 10 that all blocks of data have been transferred for a single page. The board reset command initializes the interface 10 and clears all registers and buffers. The printer start command initiates the print sequence including paper feeding in the printer 14. The DMA ready to send command is an enable command to allow the interface 10 to issue DRQN or DMA requests to a platform bus interface 18 to start the DMA transfer.

The board status register 26 contains bit mapped status information on the condition of the interface 10, which is transmitted to the host computer system 12. The board status register bits include, but are not limited to, an interface board status interrupt bit, an engine unit status interrupt bit, a printer ready status bit, an underrun status bit and a terminal count status bit. The interface board status interrupt bit is set high when an interface board status is present. The engine unit status interrupt bit is set high when a engine status is present. The printer ready status bit is set high after printer initialization and, when set high, sends an interrupt to the host computer system 12 via the control lines. The underrun status bit is set high if a print underrun occurs and, when set high, sends an interrupt to the host computer system 12 indicating that the bit mapped data is not being transmitted to the printer 14 at a high enough rate. An underrun condition occurs when the host computer system 12 cannot keep up with the required data output rate of the printer 14 and a FIFO 52 associated with interface 10 and the printer 14 runs out of data to feed to the printer 14. The terminal count status bit is set high when a DMA end of block occurs which indicates that the present DMA cycle from the host computer system 12 has ended and the DMA must be reinitialized. This bit may also be set high if the host computer system 12 has run out of data.

The engine command register 28 is preferably an 8 bit parallel to serial shift register into which data is latched and serially transferred to the printer 14 from the host computer system 12. The data retained in the engine command register 28 also provides the platform bus interface 18 with the ability to read back the original command data.

The engine status register 30 is preferably an 8 bit serial to parallel shift register which holds the printer status data in parallel format and is read by the platform bus interface 18 and transmitted to the host computer system 12. The status data remains in the engine status register 30 until the status data is replaced by new data.

multiplexer 34 receives the bit mapped data from the platform bus interface 18. The multiplexer 34 also receives the command data and status data from the platform bus interface 18 once the address bits associated with the status data or command data have been decoded by the address decoder 22. The multiplexer 34 directs the data received from the platform bus interface 18 to one of at least five data buses. In the preferred embodiment, the data buses include a board command bus, a board status bus, a printer command bus, a printer status bus and an error status bus 36. For the sake of simplicity, the board command bus and board status bus are indicated by a single bus line 38. The printer command bus and printer status bus are also indicated by a single bus line 40.

The error status bus 36 transmits data from the multiplexer 34 to the front panel registers 32. The data transmitted by the error status bus 36 communicates to the printer 14 the detection of an error. Such an error can occur, for example, when the printer 14 is out of paper, a paper jam has occurred or the paper cassette has not been properly installed in the printer 14.

The board command data bus 38 transmits board command data from the host computer system 12 to the board command register 24. The board status data bus 38 transmits board status data from the board status register 26 to the host computer system 12 via the multiplexer 34 and the platform interface bus 18. The printer command data bus 40 transmits printer command data from the host computer system 12 to the printer command register 28. The printer status data bus 40 transmits printer status data from the printer status register 30 to the host computer system 12 via the multiplexer 34 and the platform bus interface 18.

The data from the board command register 24 and the board status register 26 are transmitted to an interface control logic circuit 48. The interface control logic circuit 48 communicates between the interface 10, the printer 14 and a random access memory 52 (SRAM) or memory means via ENG/IF 50. The ENG/IF 50 communicates with the data bus 16 via the multiplexer 34 to initially receive and store a predetermined amount of the bit mapped data. The interface control logic circuit 48 controls the flow of data so that the data from the host computer system 12 is transmitted to the printer 14 at a rate corresponding to the printer's data output rate. The data is transferred from the interface control logic circuit 48 to the engine interface block (ENG/IF) 50.

Figure 2:
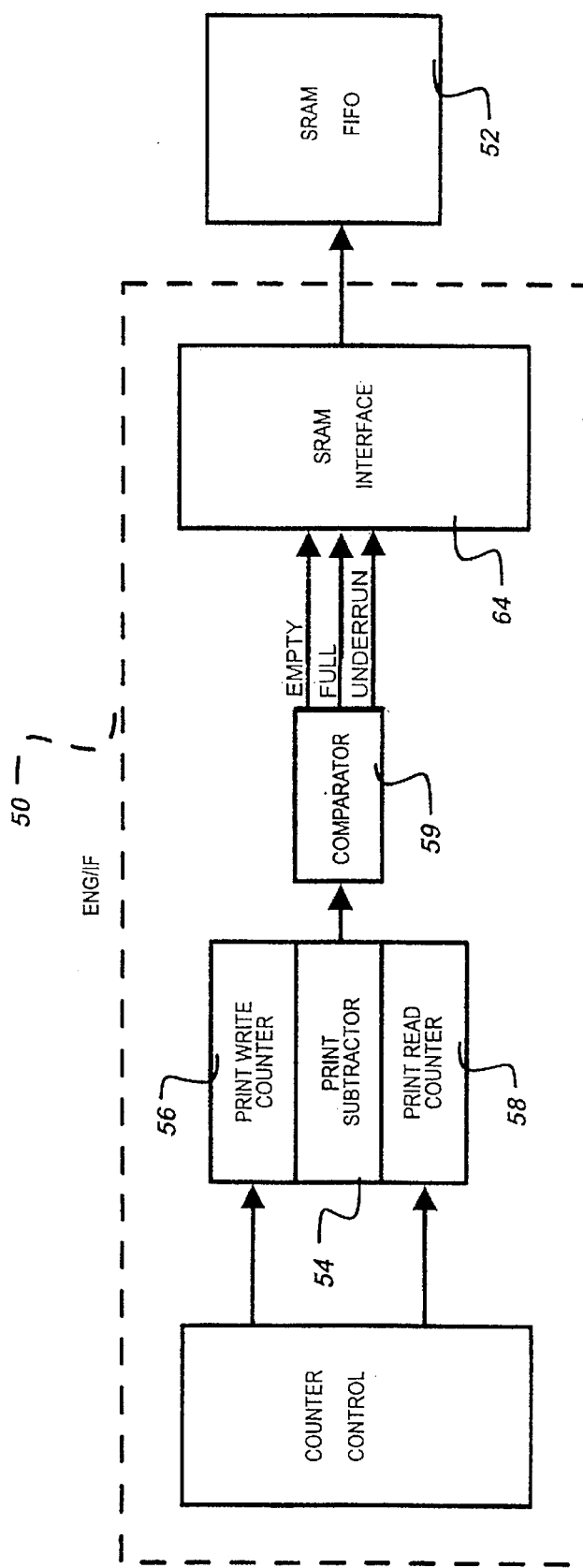
FIG. 2 is a schematic block diagram of a FIFO counter control circuit contained within the interface of FIG. 1.

Referring to FIGS. 1 and 2, the engine interface block (ENG/IF) 50 contains the logic necessary to control the operation of the DMA requests to the host computer system 12 and to make sure that complete pages of data are transferred from the host computer 12 to the printer 14 at an appropriate rate for efficient printer operation. The ENG/IF 50 comprises a pair of 16 bit counters 56, 58 (FIG. 2). Both counters are set at zero at the beginning of each page and subsequently count in an upward direction as data are received in the SRAM FIFO 52 until the capacity of the SRAM FIFO 52 has been reached and then roll over to zero and resume counting.

Referring to FIG. 2, the first counter 56 is a fill counter, otherwise referred to as a write counter or write means, and provides address control for the SRAM FIFO 52 input data. In the present embodiment, counter 56 is incremented by each DMA data write cycle from the host computer 12. The second counter 58 is an empty counter, otherwise referred to a read counter or read means, and provides address control for the SRAM FIFO 52 output data. In the present embodiment, counter 58 is incremented by each transfer cycle from the interface 10 to the printer 14. Thus the SRAM FIFO 52 and the counters 56, 58 combined with appropriate control logic, comprise a FIFO buffer, or circular queue buffer with counter 56 being the head pointer and counter 58 being the tail pointer. In the preferred embodiment, the counters 56 and 58 operate at approximately the same average rate to prevent an overrun or underrun condition in the printer 14. An overrun condition occurs when the interface board SRAM FIFO 52 is full, and subsequent data transfers from the host computer 12 via DMA are lost. An underrun condition occurs when not enough data is transmitted by the host computer 12 to the interface board, and subsequently transferred to the printer 14 in time to keep up with the data rate required for the page being printed, thereby causing a portion of the data to not get printed on the page. Since one of the intended devices for the interface 10 includes a page printer which is not capable of start-stop operation within a single page, an underrun condition results in the printing of a partial page.

An SRAM interface 64 reads or writes data to the SRAM FIFO 52. The SRAM interface 64 comprises a set of two into one multiplexers which generate two write signals to the SRAM FIFO 52 for every DMA write signal transmitted from the host computer system 12. Therefore, each word is broken into two bytes.

Referring to FIGS. 1 and 2, a subtractor circuit 54 continuously calculates the difference between the two counters 56, 58. Specifically, the difference between each bit of the write counter 56 and the read counter 58 is calculated. The difference between the counters 56, 58 reflects the degree of fullness of the SRAM FIFO 52. A difference value of zero indicates an empty or underrun condition. A difference value which is within a predetermined range which is proportional to the capacity of the SRAM FIFO 52, preferably greater than 95% of the memory size, indicates a full condition. A value which exceeds the capacity of the memory indicates an overrun condition which signifies the loss of data.

Referring to FIG. 2, a comparator 59 compares the difference value obtained from the subtractor 54 to a fixed threshold value. The present data condition determines the DMA request logic which is to be transmitted to the host computer 12. The possible conditions are an underrun condition where not enough data is being transmitted to the printer 14, an overrun condition in which too much data has been transmitted to the printer 14 and there is a loss of data or a full condition in which an adequate amount of data is transmitted to the printer 14. The full value and empty value are set to predetermined thresholds, typically expressed as a percentage of the capacity of the SRAM FIFO 52. The full value is equal to the upper threshold value which in the preferred embodiment occurs when the difference between the write signal and the read signal is greater than 0FE hexadecimal. The empty threshold value is equivalent to the lower threshold value which occurs when the difference between the write signal and the read signal is less than or equal to 0FE hexadecimal. An overrun condition occurs when the difference between the write signal and the read signal is less than or equal to zero. When the difference between the write signal and the read signal is greater than the upper threshold, DMA requests are discontinued. When the difference between the write signal and the read signal is less than the lower threshold, DMA requests to the host computer 12 are asserted.

Figure 3:
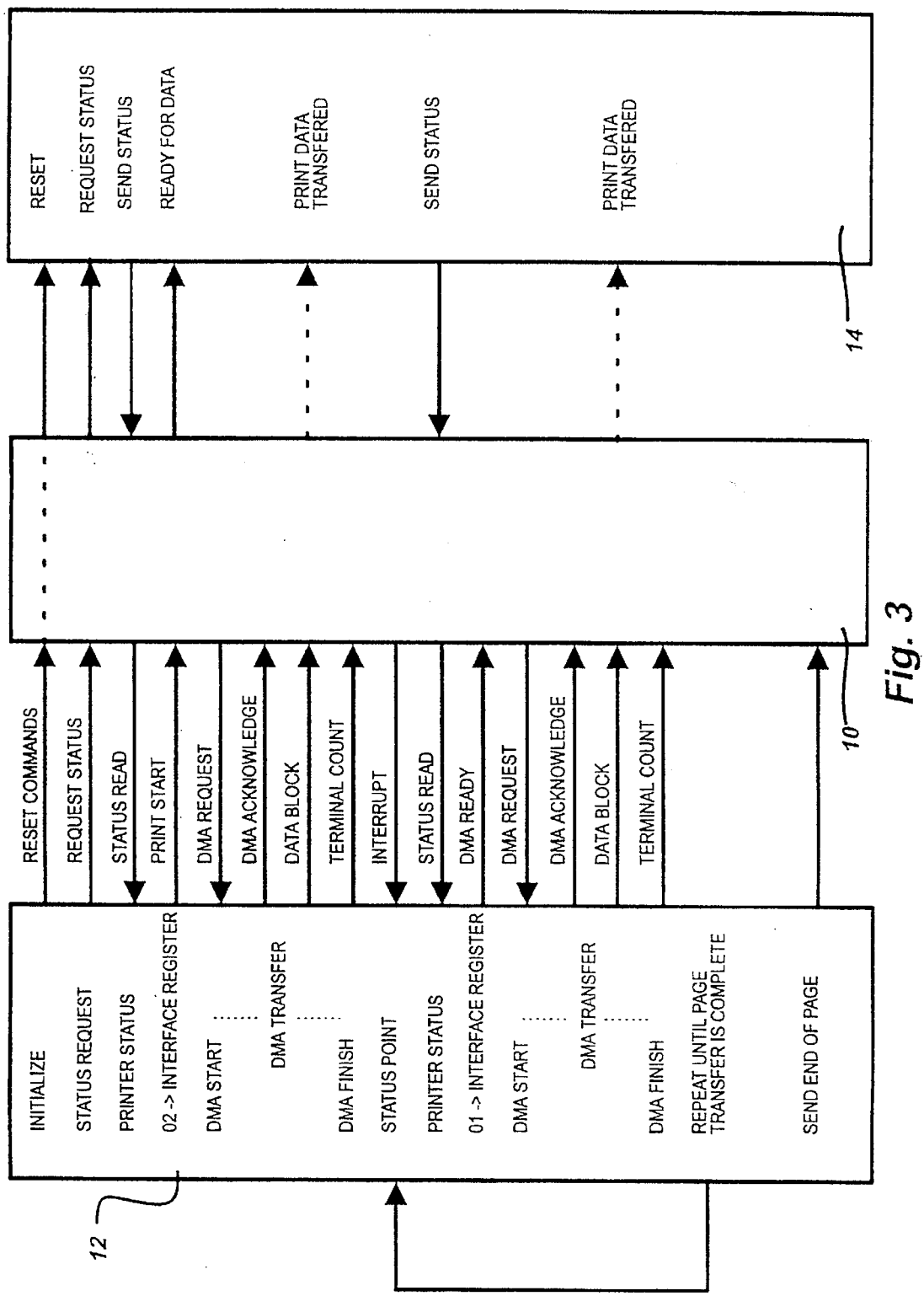
FIG. 3 is a diagram of the DMA protocol employed by the interface of FIG. 1.

FIG. 3 is a block diagram which depicts the DMA protocol between the host computer system 12, the interface 10 and the printer 14. When the host computer system 12 wishes to transfer data to the printer 14 for printing a document, the host computer system 12 sends an initialization signal to the interface 10. In response to the initialization signal, the interface 10 resets all registers and sends a signal to the printer 14 so that the printer 14 also resets. Next, the host computer system 12 transmits a status request signal to the interface 10 to determine the status of the printer 14. The interface 10 transmits a signal to the printer 14 requesting its current status. The printer's status includes, but is not limited to, that the printer 14 is ready to receive data, that the printer 14 is already receiving data from another device or that the printer 14 is disabled due to, for example, being out of toner or paper. The printer 14 transmits its status to the interface 10 which transmits the status to the host computer system 12. If the printer 14 is ready to receive data, the host computer system 12 first establishes pointers to the data to be transferred and then programs the host DMA channel with the established pointers. The host computer system 12 then transmits a print start signal to the interface 10 which is transmitted to the printer 14 by the interface 10.

Upon reception of the print start command, the interface 10 transmits a DMA request signal to the host computer system 12 requesting the transfer of data to the printer 14. When the host computer system 12 receives the DMA request signal, the host computer system 12 transmits a DMA acknowledgment signal back to the interface 10. After the acknowledgment signal is transferred, the host computer system 12 begins to transfer data to the printer 14 via the interface 10. After the transfer is completed, the interface 10 reasserts the DMA request, and if sufficient room remains in the SRAM FIFO 52, the interface 10 then reasserts the DMA request. The data are transmitted at a rate determined by the host computer system 12 DMA channel, and further constrained by host interrupts and other sources of system latency. Data received via the interface 10 are first stored in the SRAM FIFO 52, and then are transmitted at a continuous rate such that the data are continuously received by the printer 14. When the host computer 12 has completed transmitting a block of data of a predetermined size, the host computer's DMA channel controller transmits a terminal count signal to the interface 10 indicating that the whole block has been transferred. This signal is latched in the board status register 26, disables further DMA requests via the board command register 24, and generates an interrupt on the host computer bus 16 to inform the host computer software that the interface 10 needs attention.

The board status register 26 is read by the host computer system 12 and if there is additional data within the host computer system 12, the host computer system 12 first reprograms the DMA controller with new addresses, and then restarts DMA activity by issuing a DMA enable command to the board command register 24. The interface 10 in response transmits a DMA request signal to the host computer 12. The host computer 12 then sends a DMA acknowledgment signal to the interface 10 and begins to send the next data block to the printer 14 via interface 10. This process continues until the data for a complete page have been transferred. After the data for a complete page have been transferred, the host computer system 12 transmits an end of page signal to the interface 10 to terminate data transfer.

Figure 4:
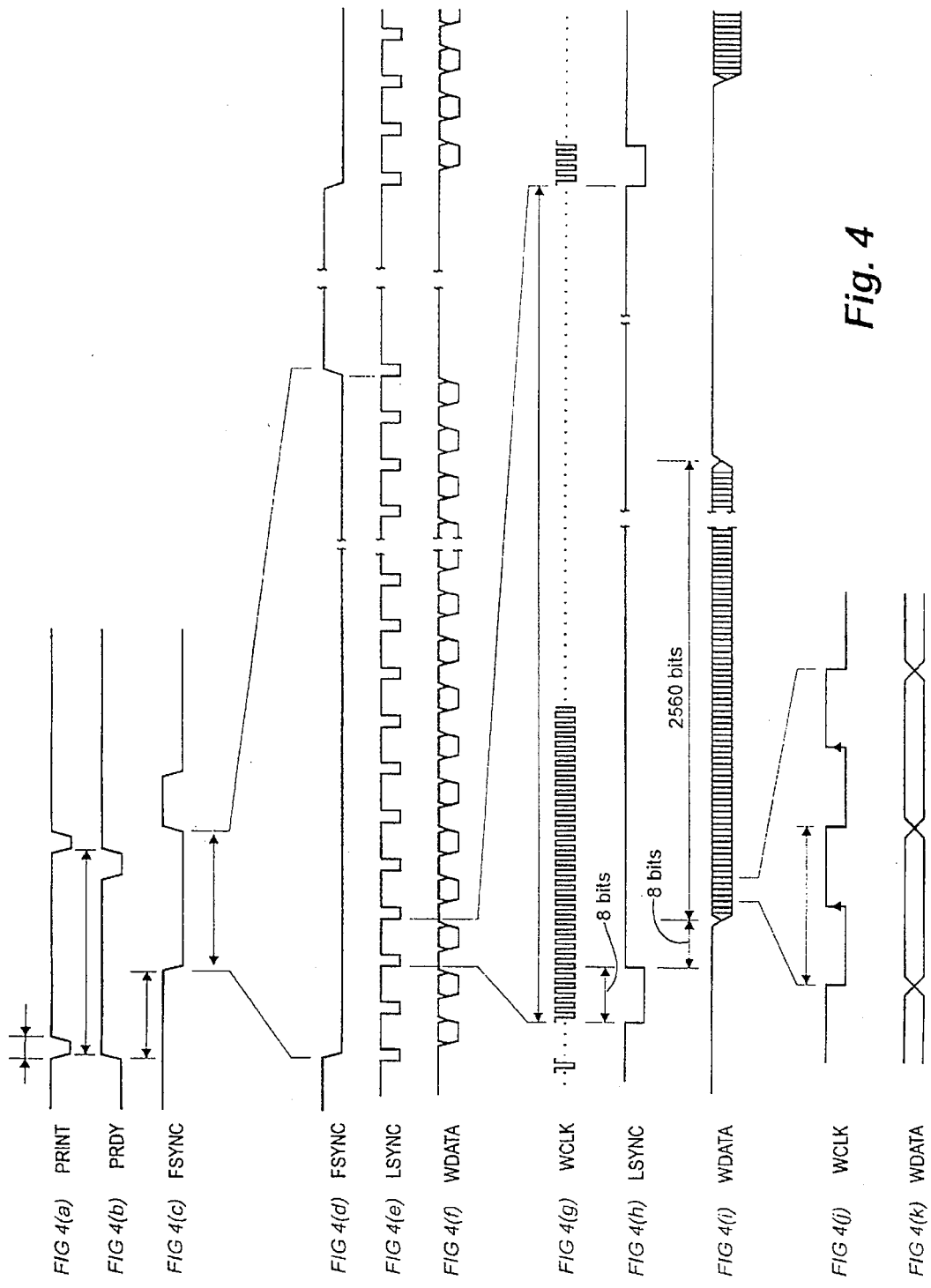
FIGS. 4a–4k are a series of timing diagrams for the interface of FIG. 1.

Referring to FIGS. 4a–4k, there are shown a number of timing diagrams depicting the relative time frames for each printing sequence to occur. It should be understood that these signals are illustrative only and are specific to a particular implementation of this technology for demonstrative purposes. It should be apparent to those skilled in the art that this technology can be adapted to many types of interfaces such as small computer system interfaces (SCSI), and parallel interfaces without departing from the scope and spirit of this invention. Referring to FIG. 4a, a print start command is transmitted from the host computer system 12 to the interface board 10 via the board command register 24 as previously described. This command is subsequently translated into a PRINT signal to the printer 14 which results in print cycle initiation including paper feed start. The PRINT signal remains low until the print ready signal PRDY (FIG. 4b) becomes busy or high. The PRDY signal is transmitted from the printer 14 and indicates that the printer 14 is available to print when the signal is low or that the printer 14 is busy when the signal is high. Referring to FIGS. 4c and 4d, a frame sync signal FSYNC indicates that a page is positioned in the printable region of the printer 14, and that data transfer must be initiated. FIG. 4d is an expanded version of a low FSYNC signal. The FSYNC signal is low for the duration of the page printing and may vary in duration based upon page length, engine speed, etc. The FSYNC signal is expanded in FIG. 4d so that the timing of the page printing components can be better observed.

Referring to FIGS. 4e and 4h, a line sync signal LSYNC is a synchronous signal transmitted by the printer 14 which corresponds to the beginning of each scan line of dots to be printed. The dot data for a given horizontal scan line must be shifted into the printer 14 upon reception of this signal. In this respect, LSYNC can be thought of as a horizontal sync pulse. In the preferred embodiment, approximately 3150 LSYNC signals are transmitted per page, one for each horizontal dot row on a standard 11 inch page. This number is obviously variable depending on the length of the paper, the resolution of the printer 14 in vertical dots per inch, etc. Referring to FIGS. 4f, 4i and 4k, a write data signal WDATA is transmitted by the host computer system 12 and represents dots to be placed on the paper. The WDATA signal is synchronized with a write clock signal WCLK. The WDATA signal is low to indicate a black signal and high to indicate a white signal and, in conjunction with the WCLK signal, represents the on or off status for each horizontal dot within a given scan line across the page. For a 300 dot per inch implementation, there are 2560 WDATA positions in each scan line. Referring to FIGS. 4g and 4j, the WCLK signal is a free running serial video clock signal which is transmitted by the printer 14. During an active scan line, i.e. FSYNC is asserted, and LSYNC has occurred, there are eight idle clocks during LSYNC, and eight idle clocks after the trailing edge of LSYNC, then each subsequent cycle of WCLK represents one dot position horizontally for the duration of the present horizontal line. Thus there are 3560 cycles of active WCLK/WDATA pairs for each horizontal scan line at 300 dots per inch. The WCLK signal is used by the printer 14 to shift each dot into temporary storage for printing of the horizontal line.

The transmission of data from the host computer system 12 to the printer 14 at a continuous data rate requires software manipulation as well as hardware manipulation. The data is manipulated by the software such that the data rate of the host computer system 12, which may be slower than that of the printer 14, is increased such that it is within a predetermined range of the data output rate of the printer 14. It is further to be understood that the data transfer does not have to necessarily take place between a host computer system 12 and a printer 14 but rather can take place between any suitable first device and second device as is described in detail below.

Figure 5:
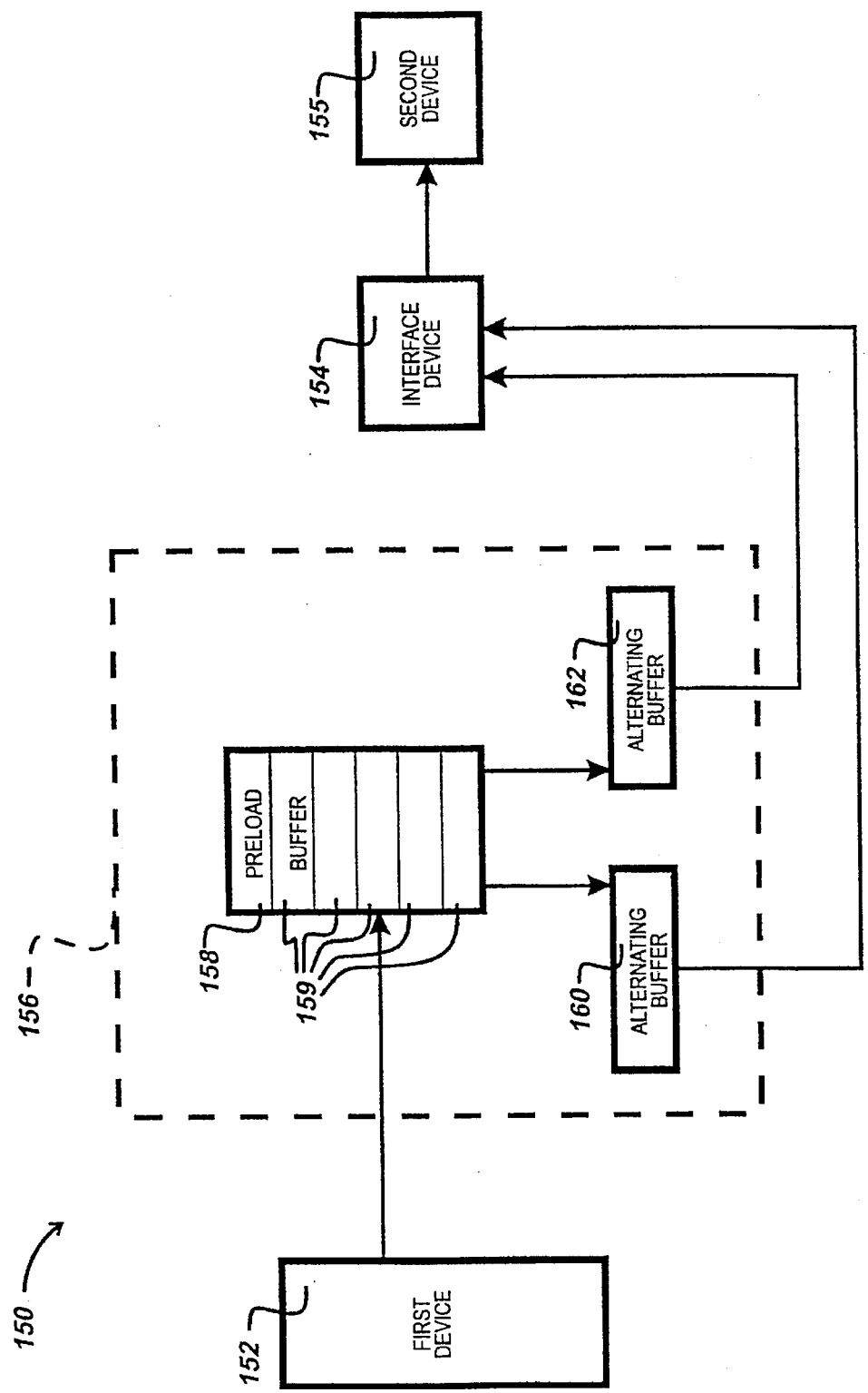
FIG. 5 is a block diagram of the buffering scheme employed by the interface of FIG. 1.

Referring to FIG. 5, there is shown a block diagram depicting a data transmission system 150 for transmitting data from a first device 152 to an interface device 154 at a continuous rate. In the preferred embodiment, the first device 152 is a host computer such as, but not limited to, a personal computer. However, it is to be understood by those skilled in the art that any type of storage device can be used without departing from the scope and spirit of the present invention. The interface device 154 preferably interfaces a second device 155. The second device 155 is preferably an input/output device such as, but not limited to, a formaterless printer, such as a laser printer, an ink jet printer or an LED printer, as well as a facsimile machine or scanner. It is to be understood by those skilled in the art that the second device 155 can be any suitable I/O device without departing from the scope and spirit of the present invention.

The first device 152 transmits data stored within its memory at a first data output rate. The interface device 154 outputs data at a second data output rate which is different from and may be faster than the first data output rate. For example, an 8 page per minute LED printer which has a data output of 300 dots per inch requires a data rate of at least 200 kilobytes per second. However, a typical host computer system 12 sometimes cannot sustain this required data rate of the printer.

A buffering scheme 156 is inserted between the first device 152 and the interface device 154 for supplementing the rate of the first device 152 so that it is within a predetermined range with respect to the data output rate of the interface device 154. The buffering scheme 156 includes an image preload buffer 158 or preloading means for initially receiving a predetermined amount of output data from the first device 152. A predetermined amount of the initially received data from the first device 152 is preloaded and stored within the buffer 158 prior to transferring any of the data to the interface device 154. The amount of data which is preloaded into the buffer 158 is determined by the relative data output rates of the first device 152 and the interface device 154, and the file location of the data to be transferred from the first device 152. As is well known to those skilled in the art, the more the data is fragmented on a disk drive or other memory device of the first device 152, i.e., the data are divided into multiple portions which are stored on different areas of the disk, the slower the data output rate from the first device 152. At least a portion of the data initially received from the first device 152 is transmitted at a third data output rate. The third data output rate is preferably generally equal to the output rate of the interface device 154. The preload buffer 158 continues to receive additional output data from the first device as the initially received data is transmitted from the preload buffer 158.

The preload buffer 158 is preferably divided into a plurality of data blocks 159 of generally equal size. As such, data is transmitted to and from the preload buffer 158 at a rate of one data block at a time. The preload buffer 158 may either be a static buffer of a fixed size or a dynamic buffer which may change its size based upon the above factors. In the preferred embodiment, the size of the preload buffer 158 is preferably determined by performing empirical testing based on the above-mentioned factors.

In an alternative embodiment, decompression techniques can be used to decompress the data as it is transmitted from the preload buffer 158. Because the data is expanded, multiple data transfers must be completed to transfer a single block of data contained within the preload buffer 158.

Associated with the preload buffer 158 are a pair of alternating buffers 160, 162. The alternating buffers 160, 162 are preferably DMA buffers. Each DMA buffer 160, 162 is preferably generally equal in size and is sized to receive a single block of data at a time from the preload buffer 158. The size of each alternating buffer 160, 162 is preferably less than the predetermined amount of data initially received and stored in the preload buffer 158. A first DMA buffer 160 first receives a block of data from the preload buffer 158 and then transmits the data to the interface device 154. A second DMA buffer 162 first receives a block of data from the preload buffer 158 and then transmits the data to the interface device 154. The buffers 160, 162 are arranged so that when one of the buffers is receiving data from the preload buffer 158, the other buffer is transmitting data to the interface device 154. The interface device 154 in turn can transmit data to the second device 155.

In the preferred embodiment, the DMA buffers 160, 162 alternately read data from the preload buffer 158 and write data to the interface device 154 which is commonly known as an alternating or ping pong buffer scheme. The DMA buffers 160, 162 operate in such a manner that data is continuously transferred to the interface device 154 at a rate which is equal to the required data output rate of the interface device 154 such that the second data output rate is continuously maintained.

If decompression techniques are used, multiple data transfers are required to transmit a single block of data from the preload buffer 158 to the alternating buffers 160,162. In the preferred embodiment the blocks within the preload buffer 158 and the alternating buffers 160,162 are approximately the same size. When the data from a preload buffer block is decompressed, the decompressed data is typically three to four times the size of one of the alternating buffers 160, 162. It is to be understood that while more data transfers are required using the decompression technique than the preferred embodiment, the data is still transferred at a rate which is equal to the required data output rate of the interface device 154.

The buffer scheme 156 is preferably operated by an interrupt driven multitasking scheme. Multitasking allows for two or more discrete operations to occur at approximately the same time. Each operation is identified as a single task in the multitasking scheme and is initiated by a common thread. In the present embodiment, two tasks are required. The first task is a low priority task. The low priority task is a background task which is designed to keep adequate data within the preload buffer 158 by transferring data from the first device 152 to the preload buffer 158 at an adequate rate. The second task is a high priority task or a foreground task. The foreground task is initiated by a hardware interrupt from the interface 10 through the ISA bus 16 as a request for more data. The hardware interrupt occurs after the interface 10 receives a signal from the platform bus interface 18 signifying that the interface 10 has completed the transfer of the date to the DMA buffer 160, 162. When an interrupt occurs, the background task is halted until completion of the foreground task. The foreground task logically switches the active DMA buffer 160, 162 with the inactive DMA buffer 160, 162. The foreground task then reprograms the DMA for the active DMA buffer and fills the inactive DMA buffer from the preload buffer 158.

Figure 6:
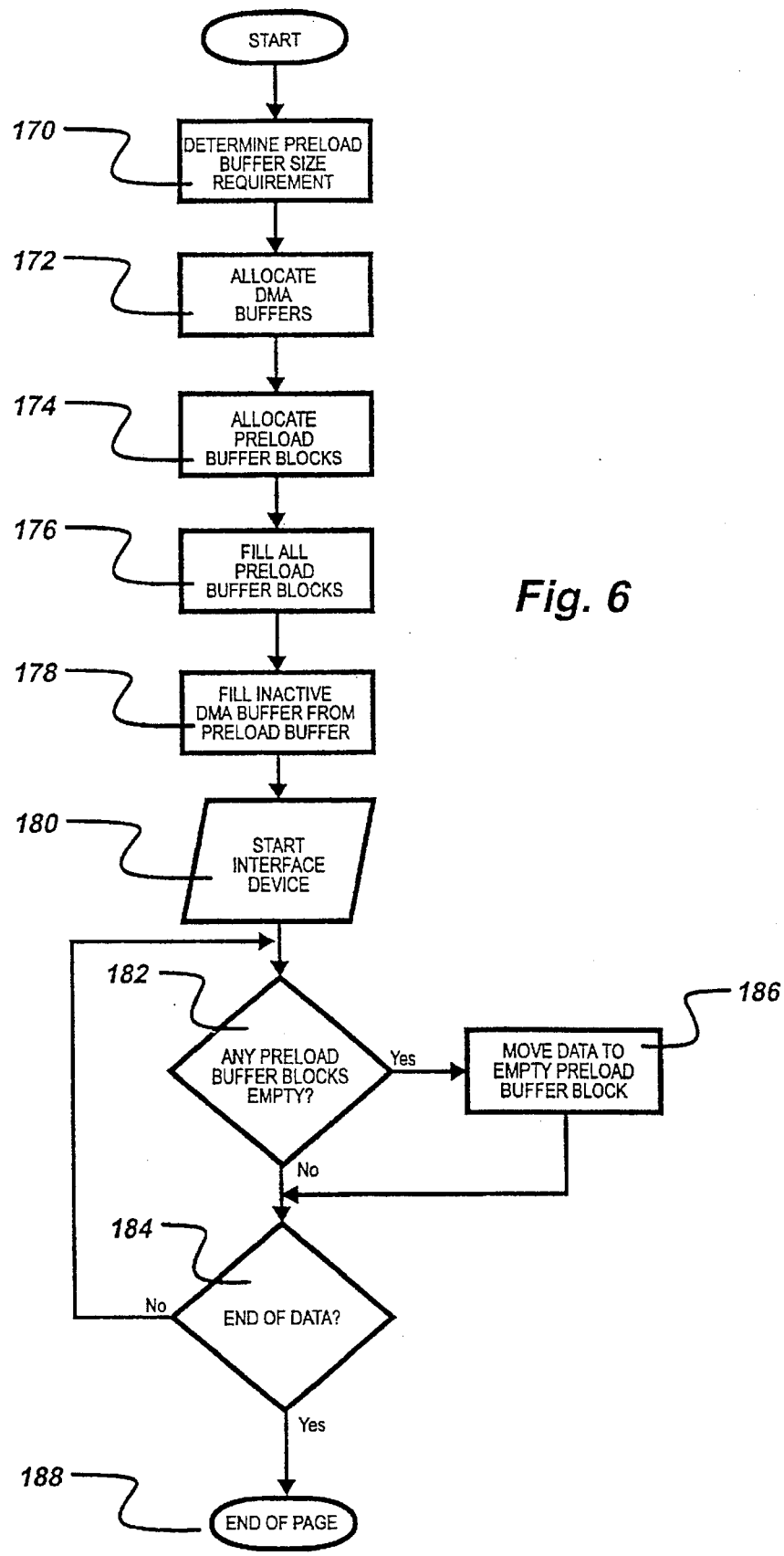
FIG. 6 is a flow chart of a low priority task employed by the interface of FIG. 1.

Referring to FIG. 6, there is shown a flow chart depicting the low priority task. In block 170, the required size of the preload buffer 158 is determined as will be discussed in detail hereinafter. In block 172, the two DMA 160, 162 which are preferably 16 kilobytes in size, are allocated to perform the alternating buffer scheme. In block 174, the preload buffer 158 is allocated to be used by the first device 152 to preload a predetermined percentage of the data which are to be transferred to the interface device 154. As discussed, in the preferred embodiment the preload buffer 158 comprises a predetermined number of data blocks 159. The number of blocks 159 selected for the preload buffer 158 is preferably determined by empirical testing based on the performance of the platform bus interface 18 and host system.

In block 176, the entire preload buffer 158 is preloaded with data from the hard disk or other memory device of the first device 152. In this embodiment, the preload buffer 158 is specifically sized to receive the initially received data from the first device 152. Preloading the preload buffer 158 causes the rate of data transfer from the first device 152 to the interface device 154 to be increased. In block 178, the inactive DMA buffer is filled with data from the first preload buffer block. Once the data has been removed from the first preload buffer block, the first preload buffer block is indicated as being empty. Once the preload buffer 158 and the inactive DMA buffer have been preloaded, the interface device 154 is started in block 180. Once the interface device 154 is initiated, the output data rate of the interface device 154 must be maintained. Therefore, a continuous stream of data from the DMA buffers 160, 162 to the interface device 154 must be maintained to achieve the desired output. In block 182, the preload buffer blocks 159 are continually monitored to see if any of the preload buffer blocks 159 are marked as empty. If a preload buffer block 159 is marked as empty and there is still data to be transferred from the first device 152, the preload buffer blocks 159 are filled one at a time in a linear fashion from the data at block 186. If no data is left at block 184, the background task is complete and an end of page signal is transmitted to the interface device 154 at block 188.

Figure 7:
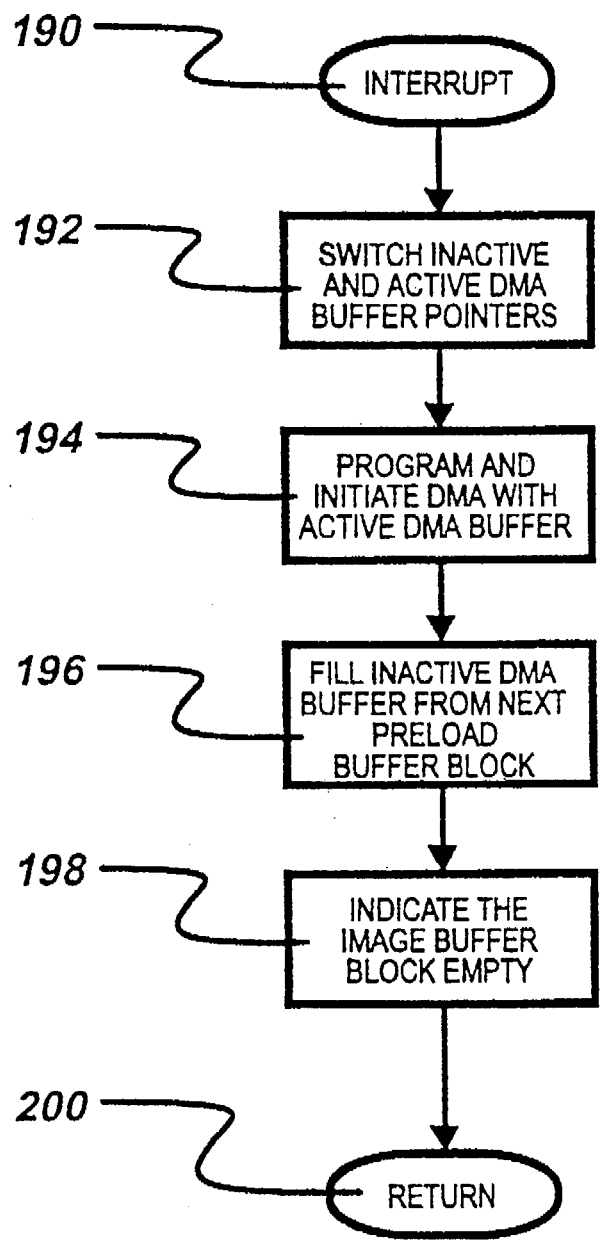
FIG. 7 is a flow chart of a high priority task employed by the interface of FIG. 1.

Referring to FIG. 7, there is a flow chart depicting the high priority task. In block 190, a hardware interrupt is initiated by the interface 10 to the first device 154 as a request for more data. In block 192, the DMA buffers 160, 162 are switched by swapping the address pointers 60 (FIG. 1) that identify the active and inactive DMA buffers. Once the DMA buffers 160, 162 have been logically switched, the active DMA buffer address is programmed into the platform DMA processor and initiated at block 194. Data is moved from the next available preload buffer block 159 containing data to the inactive DMA buffer and the preload block 159 is indicated as being empty at block 196. In block 198, the preload buffer block 159 is marked empty so that it is filled by the first device 152 during the background task. In block 200, the processor thread of execution is returned to the background task and the interrupt service routine or foreground task is completed.

Figure 8:
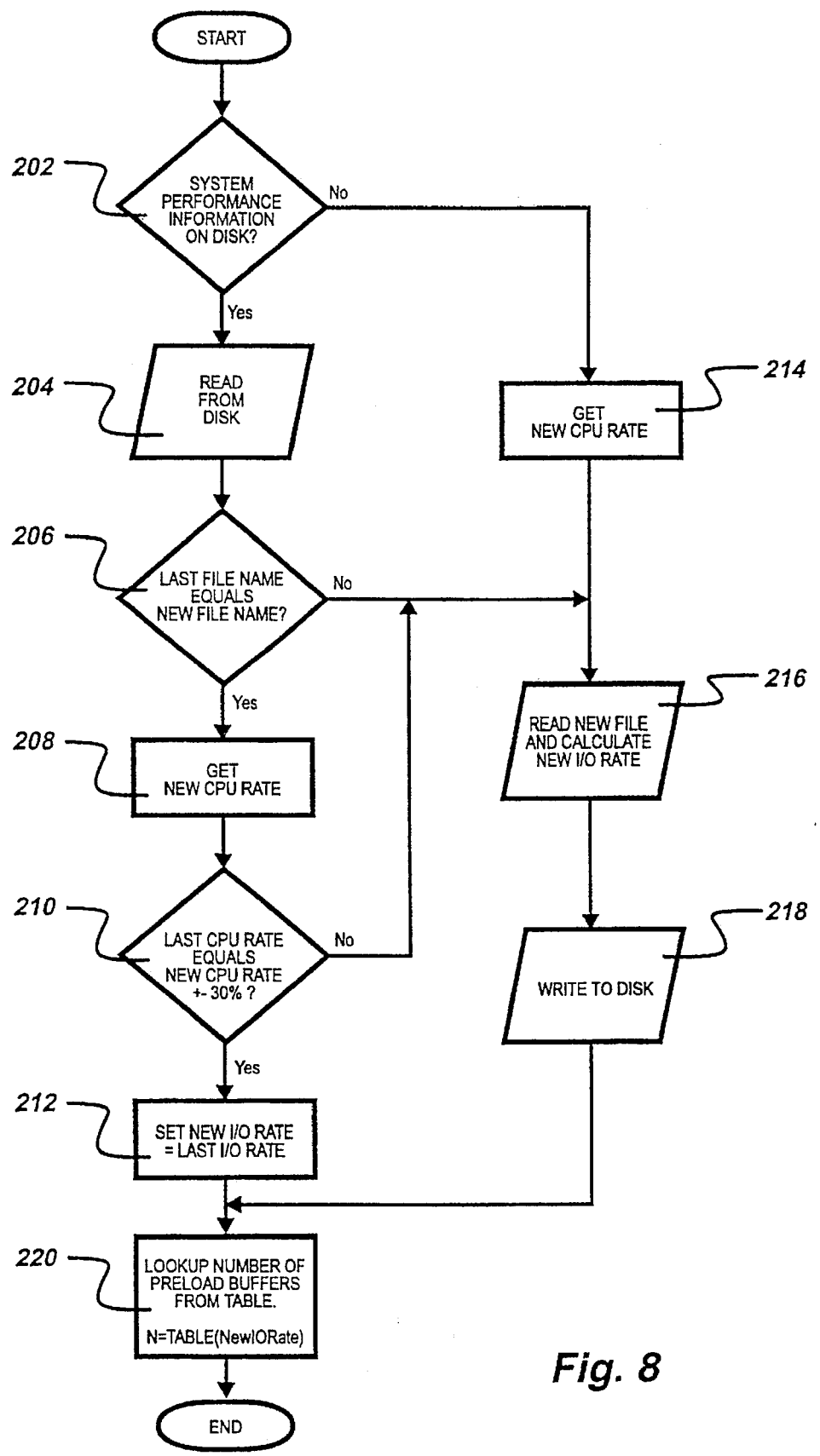
FIG. 8 is a flow chart for determining the size of the buffer of the interface of FIG. 1.

Referring to FIG. 8, there is shown a flow chart for determining the preload buffer size when the preload buffer 158 is a dynamic buffer. In block 202, it is determined whether the system bench mark information is contained on the hard disk or other memory device of the first device 152. The bench mark information provides data relating to previous transfers of bit mapped data from the first device 152 to the interface device 154. If the system performance information is logged on the disk, then specific performance data is read from the disk at block 204. The data read includes, but is not limited to, the last CPU speed, the last input/output rate and the last file name and physical location on the disk of information transferred from the first device 152 to the interface device 154. The last CPU speed indicates the speed at which the CPU bench mark previously ran. The last input/output rate indicates the last input/output rate in kilobytes per second of the file read. The input/output rate is typically in a range from 50 Kbytes/sec to 400 Kbytes/sec. The last file name and location indicates the path and file name of the last image file read by the disk.

In block 206, it is determined if the last file name and location equals the new file name and location requested to be accessed. If the last file name and location is the same as the new or current file location then the CPU bench mark is run to get the new CPU rate at block 208. Next, it is determined if the last CPU rate equals the new CPU rate or alternatively is within plus or minus 30% of the last CPU rate at block 210. If the last CPU rate and the new CPU rate are not within the 30% of one another, then the system performance has drastically changed and the file input/output performance must be recalculated. If the last CPU rate and the new CPU rate are within 30% of one another, then the new input/output rate is equal to the last input/output rate at block 212. By setting the new input/output rate to the last input/output rate an indication is made that the system performance has remained substantially the same.

If the system performance information is not located on the disk in block 202, then a CPU bench mark is run to get the new CPU rate at block 214. If no system performance information is located on the disk, this means that the program has not yet been run. A bench mark loop is timed to produce the new CPU rate. Once the new CPU rate is formed, a new file is read and the new input/output rate is calculated at block 216. This step is also performed if the last file name does not equal the current file name or location. The new file is read into a small buffer which is reusable. The amount of time it takes to read the data from the new file is used to calculate the new input/output rate in kilobytes per second. Once the input/output rate has been calculated, the new CPU rate, input/output and file name are written to the disk in block 218. By writing the system performance information to the disk, the information is saved. Next, a lookup process is performed of the number of preload buffer blocks 159 from a lookup table at block 220. The new input/output rate is used to perform a lookup in a table which contains the number of preload buffer blocks required for the new input/output rate. Therefore, it is the combination of the CPU speed, the input/output rate and the file name and location which determines the number of preload buffer blocks 159 which must be preloaded in order to have the interface device 154 to perform at the second data output rate.

When data is to be transferred from a first device 152 to an interface device 154, the data output rates of the first device 152 and the interface device 154 are checked. Once the difference in the data output rate of the first device 152 and the data output rate of the interface device 154 is determined, a calculation is made of how much data must be preloaded to the preload buffer 158 to increase the data output rate of the first device 152 to be within a predetermined range of the data output rate of the interface device 154. The preload buffer 158 is then preloaded with the calculated amount of data and the data transfer process can begin.

Data is loaded into the alternating buffers 160, 162 which alternately transfer data to the interface device 154. When data is transmitted from one of the alternating buffers to the interface device 154, data is received by the other alternating buffer from the preload buffer 158. As the preload buffer 158 transmits data to the selected alternating buffers 160, 162, the preload buffer 158 is filled with new data from the first device 152.

Calculations are continually made during the data transfer process to determine the amount of data remaining in the first device 152 and to ensure that data is being transferred to the interface device 154 at a continuous rate. The data is transmitted from the alternating buffers 160, 162 to the interface device 154 at a data rate which is within a predetermined range of the second data output rate. The interface device 154 can then transmit the data to a second device 155.

From the foregoing description, it can be seen that the present invention comprises an interface for transmitting data to a printer or other device from a host computer system in rasterized form. It will be appreciated by those skilled in the art that changes could be made to the embodiments described above without departing from the broad inventive concept thereof. It should be apparent that the above method will operate in reverse, for example, to enable input data from a scanner or fax device. Modifications such as automatic decompression/compression of data can be inserted into the underlying data path. Similarly, the interface method to the input/output device can be made by many different physical connections, such as parallel or SCSI in addition to the demonstrated method of high speed video, without departing from the spirit and scope of this invention. It is understood, therefore, that this invention is not limited to the particular embodiments disclosed, but it is intended to cover all modifications which are within the scope and spirit of the invention as defined by the appended claims.

We claim:

1. A data transmission system for transmitting data comprising:

a first device having an output for outputting data at a first data output rate;

a preload buffer having an input connected to the output of the first device for initially receiving a predetermined amount of data from the first device and storing the initially received data, the preload buffer having an output for transmitting at least a portion of the initially received data, the preload buffer receiving additional data from the first device as the initially received data is transmitted from the preload buffer;

first and second alternating buffers having inputs connected to the output of the preload buffer for alternatingly receiving data from the preload buffer, the first and second buffers each being sized to receive a single block of data at a time from the preload buffer, the single block of data having a size less than the predetermined amount of data initially received and stored in the preload buffer, the first and second buffers each alternatingly receiving a sequential block of data from the preload buffer, the first buffer having an output for outputting a received block of data while the second buffer is receiving a block of data from the preload buffer, the second buffer having an output for outputting a received block of data while the first buffer is receiving a block of data from the preload buffer; and an interface device having inputs connected to the outputs of the first and second buffers for alternatingly receiving sequential blocks of data from the first and second buffers, the interface device also having a static random access memory for storing the alternatingly received blocks of data and an output for outputting data from the static random access memory at a second data output rate different from the first data output rate.

2. The system according to claim 1, wherein said first device is a host computer.

3. The system according to claim 1, wherein said interface device is an input/output device.

4. The system according to claim 3, further comprising a second device connected to said interface device, said second device receiving the data from the interface device at the second data output rate.

5. The system according to claim 4, wherein said second device is a printer.

6. The system according to claim 4, wherein said second device is a facsimile machine.

7. The system according to claim 4, wherein said second device is a scanner.

8. The system according to claim 5, wherein said second data output rate is approximately 200 kilobytes per second.

9. The system according to claim 1, wherein the preload buffer is static in size.

10. The system according to claim 1, wherein the preload buffer is dynamic in size.

11. The system according to claim 1, wherein the preload buffer comprises a storage area for storing a plurality of data blocks, each data block being generally equal in size.

12. The system according to claim 11, wherein said first and second buffers are a pair of direct memory access buffers.

13. The system according to claim 12, wherein said direct memory access buffers are the same size as each of the preloading data blocks.

14. An interface for transmitting data from a data storage device having a first data output rate to an input/output device having a second data input/output rate which must be continuously maintained, the second data input/output rate being different from the first data output rate, the interface comprising:

a data bus for receiving the data from the data storage device at the first data output rate;

a buffer memory in communication with the data bus for initially receiving and storing a predetermined amount of the data;

first and second alternating buffers for alternatingly receiving sequential pre-determined size blocks of data from the buffer memory at a first predetermined rate after the buffer memory has initially received the predetermined amount of data from the data storage device, the first and second buffers each receiving a single block of data at a time from the buffer memory, the single block of data having a size less than the predetermined amount of data initially received and stored in the buffer memory, the first buffer outputting a received block of data while the second buffer is receiving a block of data from the buffer memory, the second buffer outputting a received block of data while the first buffer is receiving a block of data from the buffer memory;

a static random access memory for alternatingly receiving and storing sequential blocks of data from the first and second buffers at a second predetermined rate different from the first predetermined rate, the stored data in the static random access memory being transported from the static random access memory into a continuous data stream such that a series of spaced bits is formed, the data stream being delivered to the input/output device at a rate of speed such that the input/output device substantially maintains the second data input/output rate.

15. The interface according to claim 14, further comprising a serial interface for transporting the stored data from the static random access memory.

16. The interface according to claim 14, further comprising a parallel interface for transporting the stored data from the static random access memory.

17. The interface according to claim 14 further comprising an SCSI interface for transporting the stored data from the static random access memory.

18. The interface according to claim 14, further comprising:

determining means for determining if a difference exists between the data written into the memory means and the data read from the memory means;

error means for indicating an error if the difference between the data written into the memory means and the data read from the memory means is greater or less than a predetermined value; and disabling means for disabling the input/output device when an error is detected by the determining means.

19. The interface according to claim 18, wherein said determining means is a subtractor circuit.

20. The interface according to claim 14, wherein said second data input/output rate is approximately 200 kilobytes per second.

* * * * *